Feb. 22, 1938.　　　　　S. TIJMSTRA　　　　　2,109,157
SOLVENT EXTRACTION PROCESS
Filed Feb. 4, 1936
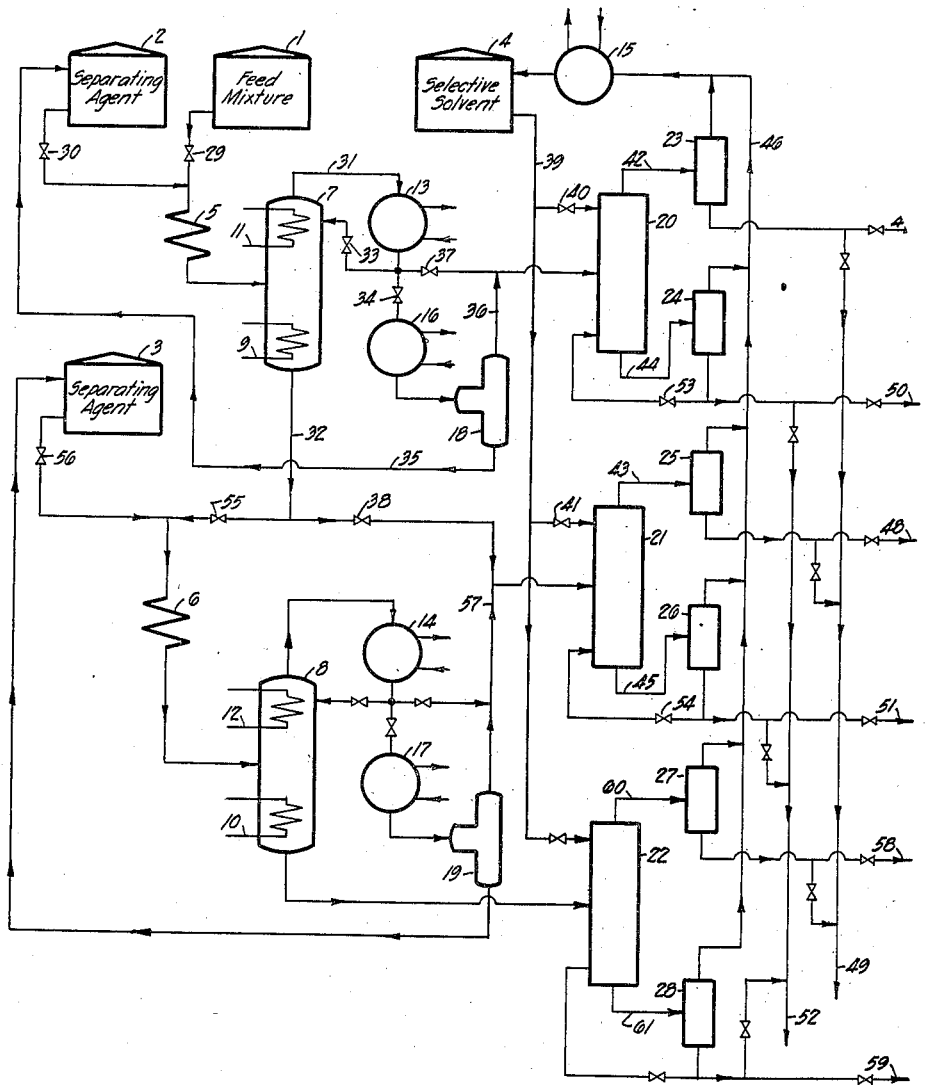
Inventor: Sijbren Tijmstra
By his Attorney:

Patented Feb. 22, 1938

2,109,157

UNITED STATES PATENT OFFICE 2,109,157

SOLVENT EXTRACTION PROCESS

Sijbren Tijmstra, Berkeley, Calif., assignor to Shell Development Company, San Francisco, Calif., a corporation of Delaware Application February 4, 1936, Serial No. 62,296

5 Claims. (Cl. 196—13)

This invention relates to methods for separating mixtures of two or more components into two or more fractions containing concentrates of said components, with the aid of selective solvents, and may be applied to the treatment of liquid mixtures, or of mixtures which may be liquefied by heating or dissolving the mixture in a solvent. One or more of the components may be solid or gaseous at ordinary temperature and pressure. More particularly, my invention is concerned with a method for improving the sharpness of the separation effected when one or more of the components of the initial mixture contain several substances of different molecular size, and is especially adapted to the treatment of mineral oils, such as crude oils, which may or may not have been stripped of the lighter fractions, petroleum residues, various mineral oil fractions, obtained by distillation of crudes or shales, or by extractions, such as lubricating oil distillates, cylinder oils, motor fuels, gas oils, kerosene, gasoline, coal tar, coal tar oils, and other hydrocarbon as well as non-hydrocarbon mixtures.

Many hydrocarbon mixtures are highly complex in character, and contain numerous hydrocarbons having different chemical structures and physical characteristics, such as volatility, viscosity, specific gravity, refractive index, viscosity index or viscosity-gravity constant, melting point, pour point, stability against oxidation or sludge formation, etc. It is known to separate such mixtures into fractions containing substances of generally similar characteristics by contacting the mixture with one or more selective solvents which are adapted to form two liquid phases when contacted with the mixture, and which contain different concentrations of the desired substances. A group of substances having generally similar chemical or physical properties is in the present specification and claims designated as a "component"; it will be evident that by the word component is meant, not only one chemically pure substance, but that this word covers also a plurality of substances. These substances will often differ from one another in molecular size.

It is known that the efficiency of an extraction process depends in a great measure upon the selectivity of the solvent used, i. e., its property to dissolve certain types of components from the material being extracted, without dissolving substantial quantities of other different types of components, and also upon its solvent power, i. e., its property not only to dissolve selectively but also to dissolve from such a material substantial quantities of the more soluble components at operating temperatures. When a mixture containing several components is contacted with a selective solvent under extracting conditions, a heterogeneous mixture is produced, which, upon reaching equilibrium, usually is found to consist of two liquid phases: one relatively rich in the solvent and containing mostly substances preferentially dissolved by the solvent, and the other relatively poor in solvent, and containing mostly substances which are less soluble in the solvent. These phases are designated as extract and raffinate phases, respectively.

It is rather generally accepted that the components segregated in the two phases by selective solvents differ from one another principally in their chemical structure; the portion which is preferably dissolved in the selective solvent during the process has become known as the naphthenic portion, and is, in the claims, identified by this term. It consists mainly of groups of substances designated as aromatics, both mono- and poly-cyclic, naphthenes, and unsaturates, or, generally hydrocarbons with relatively low hydrogen-carbon ratios, as well as sulfur and nitrogen compounds, when these are present in the mixture being extracted; the other portion of the oil, known as the raffinate, which is less soluble in the solvent, is usually referred to as the paraffinic portion, and is a concentrate of hydrocarbons with relatively high hydrogen-carbon ratio, is relatively low in aromatics, has a lower refractive index than the extract, and may contain aromatic and naphthenic compounds with relatively long paraffinic side chains.

When an initial mixture, one or more components of which contain several substances of different molecular sizes, is extracted with a selective solvent, the sharpness of the separation is lowered, because the solubility of the individual substances in a selective solvent depends not only upon its chemical structure but also very markedly upon the size of the molecule, the substances of the same chemical group of lower molecular weights being relatively more soluble than those of higher molecular weights.

For example, a petroleum fraction having a boiling temperature range of, say, 200° C., may consist substantially of paraffinic and aromatic hydrocarbons, which are more or less uniformly distributed throughout the boiling range of the fraction. When this fraction is extracted with a selective solvent for aromatics, such as BB' dichlorœthyl ether, either by a single- or multiple batch method, or by a countercurrent method, it becomes separated into a raffinate and an extract, the former having a lower refractive index, a lower specific gravity, a lower viscosity, and usually a lower boiling range than the extract. The difference in these properties apparently indicates the extent of the desired separation of the oil into two chemically different portions, viz., paraffinic and aromatic portions. However, by more careful study of these extraction products, it has been found that both the raffinate and the extract contain substances belonging to the other component, although the most effectual methods are employed to insure as complete a separation as possible; the contamination of the extract is due to the relatively high solubility of the smaller paraffinic molecules in the solvent, and the raffinate is contaminated with some of the excessively large aromatic molecules, which are relatively sparingly soluble in the solvent. This particular mis-distribution of certain substances is sometimes entirely obscured due to their relatively low concentrations, and its effects are often misinterpreted and merely ascribed to the insufficient selectivity of the solvent.

Since in the above example the solubility of low molecular weight paraffinic hydrocarbons approaches, and may in certain cases be even greater than that of high molecular weight aromatic hydrocarbons, it is apparent that a mere increase in the selectivity of the solvent is unlikely to bring about a complete separation of the initial oil solely on the basis of chemical structure. With this in view, it has, heretofore, been proposed to improve the sharpness of the extraction by distilling the initial fractions into fractions having narrower boiling ranges, as, for example, 75° C., and to extract each of these narrow fractions separately. This procedure, however, often necessitates the separate extraction of a large number of fractions.

It is an object of my invention to provide a process for separating mixtures of the type described with selective solvents which comprises the steps of subjecting the initial fraction to a preliminary distilling treatment which is effective to produce fractions having compositions particularly adapted for solvent extraction, and separately extracting one or more of these fractions. It is a further object of my invention to control the distilling operation so as to make it possible to extract fractions having considerably wider boiling temperature ranges than was feasible with the processes involving simple distillation. Other objects will be apparent from a reading of this specification.

In accordance with the present invention, the initial mixture is distilled in the presence of a separating agent of the nature of a selective solvent for the components which are preferentially soluble in the selective solvent employed in the solvent extraction step, to produce one or more distillates and a residue, and one or more of the distillation products, either together with, or free from the selective solvent, are separately extracted with a selective solvent to produce raffinate and extract phases. It should be noted that the same selective solvent may be employed in both of these steps, in which case the separation of the solvent from the distillation products prior to extraction becomes unnecessary; but even when different solvents are employed, the removal of the first solvent is not always necessary.

The fractions produced in the distilling step contain members of both components of the mixture, but in any one fraction, the members of the component which is preferentially soluble in the selective solvent have lower molecular sizes than the members of the component which is not preferentially dissolved. As a consequence of this distribution of the members of the different components, the selectivity of the solvent is aided, because those substances which it is desired to dissolve have smaller molecular sizes, and are, for this reason, inherently more soluble.

My invention will be more particularly described in connection with the accompanying drawing, which is a schematic flow diagram illustrating a preferred embodiment of the invention, it being understood that my process is not limited to the particular arrangement of apparatus illustrated.

Referring to the drawing, 1 is a source of the mixture to be extracted; 2 and 3 tanks for separating agents; 4 a tank for a selective solvent; 5 and 6, mixers; 7 and 8, distilling apparatus, provided with heating coils 9 and 10 and, if desired, with partial condensers 11 and 12, and with suitable packing or bubble plates, not shown; 13, 14 and 15, condensers; 16 and 17, cooling devices; 18 and 19, liquid phase separators, such as settling tanks or centrifuges; 20, 21 and 22, extraction apparatus, such as single stage or multi-stage treaters, or packed towers; and 23 to 28 solvent separators, such as distilling apparatus, or washing or freezing devices; all interconnected with conduits, as shown, and provided with valves, pumps, gauges, heat exchangers, and other auxiliary equipment, not shown.

While I have, for the sake of clearness in disclosing the steps of the process, shown two distilling units, 7 and 8, it should be observed that any other number of distilling apparatus may be employed; or, if desired, a single unit may be employed to yield either two distillation products, or, by operating at different temperatures, to produce a series of distillates, which may be run off to different storage tanks. Similarly, one extraction apparatus may be employed, each distillation product being separately treated therein.

The initial mixture in the tank 1 may be regarded as consisting of, or containing, two components, A and B, and the selective solvent from the tank 4 as being a selective solvent for the component B, i. e., when the mixture is contacted with the mixture, two liquid phases are formed, and the distribution constant between the solvent or extract phase and the raffinate phase is greater for B than for A.

The separating agents in the tanks 2 and 3 must be of the type of selective solvents for the component B. The expression "separating agent of the type of selective solvent for B", is in the present specification and claims, intended to designate solvents which dissolve B in preference to A, i. e., if two solutions, one containing A dissolved in a medium, and the other containing B dissolved in the same concentration in another quantity of the same medium, are separately extracted by these solvents under identical conditions, the extracted amount of B would be greater than that of A. However, frequently these solvents are capable of forming two liquid phases, and are then true selective solvents. Such a formation of two liquid phases may occur within the distilling columns 7 and 8, or only at lower temperatures. The expression "separating agent of the type of selective solvent for B" is employed to include any of the above types of solvents.

In practicing my process, the initial mixture from tank 1, e. g., kerosene or a lubricating oil fraction, and a separating agent from tank 2, e. g., o-cresol, are fed through valves 29 and 30, and mixer 5 into the fractionating column, and there distilled to produce overhead vapors and a bottom product, withdrawn at 31 and 32, respectively. The separating agent lowers the boiling point of the component A (which is not preferentially dissolved), thereby causing only the lighter members of the component B to be present in the distillate, and only the heavier members of the component A to be present in the bottom product. The separating agent may form a series of low boiling azeotropes with members of the component A, which azeotrope may also contain minor amounts of the member of the component B; but the formation of azeotropes is not essential to the operativeness of the process. If low boiling azeotropes containing large quantities of A are formed, the separation is effected more readily, but the process may also be operated when no azeotropes are formed, provided that the partial vapor pressures of the members of the component A are increased to a larger extent than the increase in the partial vapor pressures of the members of the component B. When the mixture of A and B is distilled in the presence of a separating agent which is a preferential solvent for the component B, the partial vapor pressures of the members of the component A are increased, thereby permitting the latter to be concentrated in the distillate. When azeotropes are formed, it may at times be desirable to adjust the valves 29 and 30 so as to introduce the separating agent and the component A in the same ratio as they occur in the top product removed from the column.

The overhead vapors are condensed in the condenser 13, and a portion thereof may be returned through a valve 33 as a reflux. The unreturned portion of the distillate may then be treated to separate the separating agent from the remainder of the distillate, as by an auxiliary distilling unit, which may be operated under a higher pressure, or in the presence of an auxiliary separating agent, or by feeding the combined distillate through a valve 34 and a cooling device 16 to a phase separator 18, where the condensed distillate is chilled to render the separating agent immiscible with the remainder of the distillate, and the chilled mixture is allowed to separate into two phases, a solvent phase and a distillate phase. When the separating agent is not immiscible with the distillate in the liquid form even at low temperatures, it may often be separated by freezing, or by other physical means, e. g. by extraction with another solvent, such as aqueous ethyl or methyl alcohol, or by distillation at a higher pressure. The separating agent, or a solution of the separating agent with minor amounts of the mixture, is returned to the tank 2 through a conduit 35, and the remainder of the distillate is fed to the extraction unit 20, through the conduit 36.

The removal of the separating agent is not always necessary. Thus, the same solvent may often be employed in the tanks 2 and 4; or the solvents may be of a nature that they may be employed together in the extraction unit. In these situations, the valve 34 may be closed, and the combined distillate passed directly through the valve 37 to the extraction unit.

The bottom product from the column 7 may be passed through a similar device for removing the separating agent, or the bottom product may be flown directly through a valve 38 to the extraction unit 21. The bottom product will often be substantially free from the separating agent, if the valves 29 and 30 are properly adjusted, so that the provision of separating means is not essential, even if it is desired to exclude the separating agent from the extraction unit.

In the extraction units 20 and 21, the distillation fractions may be extracted with one or more solvents, and the same or different solvents or solvent pairs may be used in each column. When the same solvent is used, the selective solvent or solvents from the tank 4 is (are) fed through a manifold 39 and valves 40 and 41, and contacted with the fractions in the extraction units, preferably in a countercurrent manner, to produce raffinate phases, withdrawn at 42 and 43, and extract phases, withdrawn at 44 and 45, these being treated in separators 23, 24, 25 and 26 to recover the selective solvent which is returned to the tank 4 through a conduit 46 and condenser 15. The raffinates may be separately withdrawn at 47 and 48, or may be blended, and withdrawn together at 49. The extracts may be similarly recovered separately at 50 and 51, or together at 52.

If desired, the efficiency of the extraction units 20 and 21 may be enhanced by providing a temperature gradient, whereby the extract phase is progressively chilled prior to its removal from the extraction zone. This is preferably done in deraffinating zones provided between the point at which the feed is introduced, and the point at which the extract is finally withdrawn. Instead of, or in addition to the temperature gradient, I may further improve the extraction by treating the extract phase with an auxiliary or second solvent for the component A, as described in U. S. Patent No. 2,023,109, or with a portion of the final extract, as by opening the valves 53 and 54, thereby employing a backwash process.

Instead of producing only two distillation products in the column 7, a plurality of fractions may be separated. This can be effected by providing the column 7 with side-strippers, and removing any desired number of side streams; and/or by subjecting the top and/or bottom products of the column 7 to further distilling treatments. In the drawing, I have shown only the last of these methods for producing several distillation products. In this method the valve 38 is closed, and the column 7 is operated to produce a larger quantity of bottoms, which are then fed through a valve 55 to the column 8. If the bottoms from the column 7 are substantially free from the separating agent, a further quantity of the same or of another separating agent, e. g., p-chlorophenol, may be added from the tank 3 through a valve 56. The distillation in the column 7 and 8 is sometimes easier when the separating agent has a boiling point near the initial boiling point of the feed mixture to the column. For this reason, it is often desirable to employ different separating agents in successive distilling stages, the separating agent in each stage being preferably selected so as to have a boiling point at the pressure obtaining in the column not more than about 25° C. below nor more than about 25° C. above the initial boiling point of the feed mixture.

The distillation in the column 8 is conducted similarly to that in the column 7, the distillate being withdrawn through the conduit 57 and extracted in the extraction unit 21, and the bottom product in the unit 22, to produce raffinates and extracts which may be recovered separately at 48, 58, and at 51, and 59, respectively, or these may be blended as described above.

When operating the distillation columns 7 and 8 to produce a plurality of fractions, it is often preferable to operate the first column in a manner to withdraw an overhead containing substantially only members of the component A, thereby obviating the necessity of subjecting the first distillate to an extraction treatment. Moreover, the last distilling step may be controlled so that the bottoms are substantially free from the component A, and the extraction of these bottoms may then not be necessary. All intermediate fractions will, however, normally contain both A and B, but the molecular sizes of the substances of the component A will be larger than the sizes of the substances of the component B which occur in the same fraction, and these fractions will, therefore, be eminently suited for extraction with selective solvents. The number of such intermediate fractions will depend upon the boiling temperature range of the initial fraction, upon the selectivity of the selective solvent, and upon the degree of separation required. In many cases a single intermediate fraction, as indicated at 57 in the drawing, will suffice and a single extraction unit 21 may then be employed; it is, however, often desirable to produce more intermediate fractions, in a manner to cause the boiling temperature ranges to be not over about 75° C. to 100° C., measured at a pressure of not over 1 mm. mercury, thereby facilitating the operation of the extraction units, and improving the degree of separation effected therein.

When several extraction products are to be blended, it is possible to blend corresponding phases from different extraction apparatus prior to distillation. Thus, the raffinate phases from the conduits 42, 43 and 60 may be led to the same distilling or equivalent separating unit 23, and the extract phases from the conduits 44, 45 and 61 may be similarly blended and treated in the same separating unit 24. When the distillation products from the distilling apparatus 7 and/or 8 contain separating agent, and are substantially free from the other component, so as to require no further extraction, these fractions may also be blended with extraction products of a similar character.

The distilling columns may be used to cause the complete or partial separation of a third component from the mixture. For example, I have found that when distilling hydrocarbon oils containing sulfur, nitrogen, or oxygen-bearing compounds in the presence of separating agents of the type of selective solvents for naphthenic hydrocarbons, all, or a substantial part of these polar compounds may be concentrated in the last bottom product, thereby effecting a refining of the other fractions.

Suitable selective solvents for separating various types of mixtures are well known in the art. For example, for the separation of hydrocarbon mixtures, such solvents at liquid $SO_2$, furfural, BB' dichloroethyl ether, phenol, cresylic acid, and aniline are suitable. These may also be employed as separating agents. Among the separating agents which are not capable of forming two liquid phases with hydrocarbons under conditions readily obtainable, but which are nevertheless included under the designation "separating agent of the type of selective solvent" are: pyridine, quinaldine, beta-gamma picoline, alpha-picoline, and refinery nitrogen bases.

While I have particularly described my invention with reference to its use for treating hydrocarbon mixtures with polar selective solvents and polar separating agents, it should be noted that the process of my invention is also useful when applied to other types of initial materials. It may be applied in any situation in which a separating agent which is a selective solvent for the members of one component or group of components of a mixture is used to concentrate one or more of these components, whether the concentration is carried to the point of producing pure products or not. For example, when separating a mixture of polar substances, such as alcohols and water, a hydrocarbon, such as benzene or cyclo-hexane, may often be employed as the selective solvent, the hydrocarbons being selective solvents for the alcohols; or mixtures of fatty oils may be separated from impurities of about the same boiling temperature range by my process.

As used in the present specification, a component is said to be pure when it contains no substances which should be present only in another component. The initial mixtures, which are in the claims said to "contain" two components which are to be separated, may further contain additional components or substances which are not considered with regard to the separation of the components under consideration, and which may occur in any or all of the final extraction products of the process, depending upon their volatilities and their solubilities in the separating agents and selective solvents employed.

I claim as my invention:

1. A process for separating a hydrocarbon fraction into paraffinic and naphthenic portions, comprising the steps of distilling the hydrocarbon fraction in the presence of a separating agent of the type of selective solvent for naphthenic hydrocarbons, to produce a distillate containing substantially only paraffinic hydrocarbons and the separating agent, and extracting at least a portion of the remainder of the hydrocarbon mixture with a selective solvent for naphthenic hydrocarbons under conditions causing the formation of two liquid phases containing paraffinic and naphthenic portions, respectively.

2. The process for separating a hydrocarbon fraction into paraffinic and naphthenic portions, comprising the steps of distilling the hydrocarbon fraction in the presence of a separating agent of the type of selective solvent for naphthenic hydrocarbons to produce a plurality of distillation fractions having boiling temperature ranges not over 100° C. and containing separating agent and hydrocarbons, separately extracting at least two adjacent fractions with a selective solvent for naphthenic hydrocarbons, under conditions causing the formation of liquid extract and raffinate phases, separating the phases, and blending corresponding raffinates obtained by separately extracting adjacent distillation fractions.

3. A process for separating a mixture containing two components, A and B, at least one of which contains different substances of different molecular sizes, into products containing concentrates of these components, comprising the steps of distilling the said mixture in the presence of a separating agent of the type of selective solvent for B to produce a distillate containing the separating agent together with substances of component A of said mixture, and a distillation residue containing substances of component B, at least one of said distillation products containing substances of both components, and extracting at least said last named distillation product with a selective solvent for B under conditions causing the formation of two liquid phases containing concentrates of the components A and B, respectively.

4. A process for separating a hydrocarbon fraction into paraffinic and naphthenic portions, comprising the steps of distilling the hydrocarbon fraction in the presence of a separating agent of the type of selective solvent for naphthenic hydrocarbons, to produce a distillate containing the separating agent together with hydrocarbons, and a distillation residue containing naphthenic hydrocarbons, at least one of said distillation products containing both paraffinic and naphthenic hydrocarbons, and extracting at least said last named distillation product with a selective solvent for naphthenic hydrocarbons under conditions causing the formation of two liquid phases containing paraffinic and naphthenic portions, respectively.

5. A process for separating a sulfur containing hydrocarbon fraction into paraffinic and naphthenic portions of reduced sulfur content, comprising the steps of distilling the hydrocarbon fraction in the presence of a separating agent of the type of selective solvent for naphthenic hydrocarbons to produce a bottom product containing a concentrate of the sulfur compounds and at least one distillate containing separating agent and hydrocarbons, and extracting at least a portion of the bottom product with a selective solvent for naphthenic hydrocarbons under conditions to produce liquid raffinate and extract phases.

SIJBREN TIJMSTRA.